US010495278B2

(12) United States Patent
Hemon (10) Patent No.: US 10,495,278 B2
(45) Date of Patent: Dec. 3, 2019

(54) VEHICLE LIGHTING DEVICE WITH ADJUSTABLE ALIGNMENT FRAME FOR AN OPTICAL ELEMENT AND METHOD FOR ASSEMBLING A LIGHTING DEVICE WITH AN ADJUSTABLE FRAME FOR AN OPTICAL ELEMENT

(71) Applicant: Valeo North America, Inc., Troy, MI (US)

(72) Inventor: Julien Hemon, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 45 days.

(21) Appl. No.: 15/474,529

(22) Filed: Mar. 30, 2017

(65) Prior Publication Data

US 2018/0283647 A1 Oct. 4, 2018

(51) Int. Cl.
*F21S 41/29* (2018.01)
*F21V 19/00* (2006.01)
(Continued)

(52) U.S. Cl.
CPC ............ *F21S 41/29* (2018.01); *F21S 41/143* (2018.01); *F21S 41/192* (2018.01);
(Continued)

(58) Field of Classification Search
CPC ........ F21V 17/005; F21V 17/02; F21V 17/04; F21V 17/06; F21V 17/08; F21V 17/10; F21V 17/104; F21V 17/107; F21V 17/12; F21V 17/14; F21V 17/16; F21V 17/162; F21V 17/164; F21V 17/166; F21V 17/168; F21V 17/18; F21V 19/02; F21V 15/01; F21V 19/0035; F21K 9/60; F21K 9/62; F21K 9/65; F21K 9/68; F21K 9/69; F21S 41/143; F21S 41/29; F21S 41/295;
(Continued)

(56) References Cited

U.S. PATENT DOCUMENTS

2003/0133307 A1\* 7/2003 Sugihara .................. B60Q 3/74
362/490
2008/0224287 A1\* 9/2008 Aizpuru .................. H01L 24/49
257/676
(Continued)

FOREIGN PATENT DOCUMENTS

DE 10 2004 056 252 A1 5/2006
EP 2 693 108 A1 2/2014
(Continued)

OTHER PUBLICATIONS

European Search Report and Written Opinion dated Aug. 23, 2018 received in European Application No. 18 164 046.7, (8 pages).

*Primary Examiner* — Britt D Hanley
*Assistant Examiner* — Steven Y Horikoshi
(74) *Attorney, Agent, or Firm* — Oblon, McClelland, Maier & Neustadt, L.L.P.

(57) ABSTRACT

A vehicle lighting device including a light source support, a light source coupled to the light source support, and an alignment frame coupled to the light source support in a predetermined positional relationship with respect to the light source. An optical element is coupled to the light source support such that the alignment frame is interposed between the light source support and the optical element.

20 Claims, 7 Drawing Sheets

(51) Int. Cl.
*F21V 29/76* (2015.01)
*F21V 29/503* (2015.01)
*F21S 41/20* (2018.01)
*F21S 41/19* (2018.01)
*F21S 41/143* (2018.01)
*F21S 45/47* (2018.01)
*F21Y 115/10* (2016.01)
*B60Q 1/04* (2006.01)

(52) U.S. Cl.
CPC ........... *F21S 41/285* (2018.01); *F21S 41/295* (2018.01); *F21S 45/47* (2018.01); *F21V 19/0035* (2013.01); *F21V 29/503* (2015.01); *F21V 29/763* (2015.01); *B60Q 1/04* (2013.01); *F21Y 2115/10* (2016.08)

(58) Field of Classification Search
CPC .......... F21S 45/47; F21S 41/25; F21S 41/255; F21S 41/26
See application file for complete search history.

(56) References Cited

U.S. PATENT DOCUMENTS

| | | |
|---|---|---|
| 2009/0303726 A1 | 12/2009 | Borgschulte et al. |
| 2010/0118550 A1* | 5/2010 | Kuo ........................ G02B 7/02 362/311.02 |
| 2011/0063874 A1* | 3/2011 | Yatsuda ................ F21S 41/141 362/612 |
| 2012/0092884 A1* | 4/2012 | Dikau .................... F21S 41/192 362/538 |
| 2012/0162983 A1* | 6/2012 | Pickholz ................. F21V 15/01 362/235 |
| 2012/0327677 A1* | 12/2012 | Furukawa ............ F21S 48/1154 362/517 |
| 2013/0039072 A1* | 2/2013 | Kim ....................... F21V 3/0625 362/294 |
| 2013/0258667 A1* | 10/2013 | Ray ......................... F21V 21/00 362/249.02 |
| 2014/0213094 A1* | 7/2014 | Rowlette ............. F21V 19/0035 439/366 |
| 2014/0294025 A1* | 10/2014 | Lee ....................... F21S 41/143 372/36 |
| 2016/0146423 A1 | 5/2016 | Lai et al. |

FOREIGN PATENT DOCUMENTS

| | | |
|---|---|---|
| EP | 2 808 912 A1 | 12/2014 |
| EP | 3 088 798 A2 | 11/2016 |
| WO | WO 2006/097067 A1 | 9/2006 |

\* cited by examiner

VEHICLE LIGHTING DEVICE WITH ADJUSTABLE ALIGNMENT FRAME FOR AN OPTICAL ELEMENT AND METHOD FOR ASSEMBLING A LIGHTING DEVICE WITH AN ADJUSTABLE FRAME FOR AN OPTICAL ELEMENT

BACKGROUND OF THE INVENTION

Field of the Invention

The present invention concerns a lighting device for motor vehicles, and in particular, a device for lighting the road.

Discussion of Related Art

Automotive vehicle headlights are equipped with one or more optical modules arranged within a housing closed by an outer lens so as to obtain one or more light beams output from the headlight. Generally, an optical module within the housing includes a light source which emits light rays, and an optical system including, for example, one or more inner lenses for shaping or directing the light rays.

It is becoming increasingly commonplace to use semiconductor light sources such as lasers and light-emitting diodes (LED) in automotive lighting. Such semiconductor light sources typically operate at high power and generate heat. Thus, the semiconductor light source (or a printed circuit board on which the light source resides) is typically mounted directly on a heat sink to dissipate heat during operation. Further, optical components such as an inner lens are mounted in relation to the heat sink. As semiconductor light sources are relatively small compared to optical elements of the system, precise alignment of the light source relative to optical elements is desirable to improve optical efficiency of the system.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY OF THE INVENTION

Current techniques for achieving precise alignment of the light source relative to optical elements provide an assembled PCB positioned on a heat sink such that it aligns with the optical component that is in a fixed position relative to the heat sink. One common alignment technique is to use a simple reference system (for example: pin and holes) between the optical element and the PCB, and /or the heatsink. However, the present inventor has recognized that there is a disadvantage of this technique in that there is an increase in the number of links of the chain of dimension, making proper alignment more difficult. Further, as the position of the LED on the PCB can vary significantly, a simple reference system may be ineffective.

Another common alignment technique is to position an assembled PCB (with the LED soldered relative to the optical element), and then drill the PCB and heat sink and provide fasteners to fix the PCB to the heat sink in the alignment position. The present inventor has recognized, however, that this process of drilling the heat sink and PCB after PCB assembly (soldering) presents a risk of creating particles that will contaminate the electronic components on the PCB. Further, the optical element is generally positioned directly to the heat sink and/or PCB, which presents thermal risks to the optical element.

One object of embodiments of the invention is to provide a system for aligning a light source with an optical element.

Another object of embodiments of the invention is to thermally and/or electrically isolate the optical element from the PCB and/or or the heatsink.

According to one embodiment, a floating frame is adding between a light source and an optical element. The frame position can be adjusted in reference to the light source position in order to obtain a good positioning between the light source and the optical element.

(1) A vehicle lighting device comprising a light source support, a light source coupled to said light source support, an alignment frame coupled to the light source support in a predetermined positional relationship with respect to said light source, and an optical element coupled to said light source support such that said alignment frame is interposed between the light source support and the optical element.

(2) The vehicle lighting device embodiment, wherein the light source support comprises a heat sink comprising a planar support surface configured to support said light source; and cooling fins configured to dissipate heat from the light source supported on the support surface.

(3) The vehicle lighting device embodiment, further comprising a thermally conducting material provided between said light source and said light source support.

(4) The vehicle lighting device embodiment, wherein the light source comprises a semiconductor lighting element mounted on a printed circuit board.

(5) The vehicle lighting device embodiment, wherein the printed circuit board is fixed to a predetermined positon on the light source support.

(6) The vehicle lighting device embodiment, wherein the semiconductor lighting element comprises a light emitting diode (LED).

(7) The vehicle lighting device embodiment, wherein the alignment frame comprises at least one reference surface configured to contact a corresponding mating surface of the optical element.

(8) The vehicle lighting device embodiment, wherein the alignment frame further comprises at least one spring member configured to bias said lens into contact with said reference surface.

(9) The vehicle lighting device embodiment, wherein the at least one spring member is configured to bias said lens in a Y-Z direction toward said reference surface.

(10) The vehicle lighting device embodiment, wherein the alignment frame comprises at least one tapered surface configured to guide the lens into position with respect to the alignment frame.

(11) The vehicle lighting device embodiment, wherein the alignment frame comprises at least one field of view reference member configured to provide a reference for a camera alignment system.

(12) The vehicle lighting device embodiment, wherein the heat sink comprises an alignment recess and said alignment frame comprises an alignment lug configured to engage the alignment recess.

(13) The vehicle lighting device embodiment, wherein the alignment recess has a diameter larger than the alignment lug such that the alignment frame is adjustable in a Y-Z direction when the alignment lug is engaged in the alignment recess.

(14) The vehicle lighting device embodiment, wherein the heat sink comprises lens contact surfaces configured to contact corresponding tabs on the optical device.

(15) The vehicle lighting device embodiment, wherein the optical element comprises a light input side having contact surfaces configured to contact corresponding contact surfaces on the alignment frame.

(16) The vehicle lighting device embodiment, wherein the optical element comprises a collimator lens.

(17) A method for assembling a lighting device comprising providing a light source support having a light source fixed to a predetermined position on a supporting surface of the light source support; placing an alignment frame on the supporting surface; adjusting the alignment frame in a Y-Z direction to an optical alignment position based on a nominal spacing from an edge of the alignment frame and the light source; and placing an optical component in said alignment frame such that a light input side of the optical component is optically aligned with the light source.

(18) The method for assembling a lighting device embodiment, further comprising a thermally conductive material provided between the supporting surface and the light source.

(19) The method for assembling a lighting device embodiment, wherein said adjusting the alignment frame comprises using a camera positioning system to move the alignment frame in a Y-Z direction to an optical alignment position based on a nominal spacing from an edge of the alignment frame and the light source.

(20) The method for assembling a lighting device embodiment, wherein said fixing an optical component in said alignment frame comprises snapping the optical component into a spring biased reference position within the alignment frame.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF INVENTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Embodiments described herein provide systems of and methods which include a floating frame added between a light source and an optical element. The frame position can be adjusted in reference to the light source position in order to obtain a good positioning between the light source and the optical element.

Figure 1:
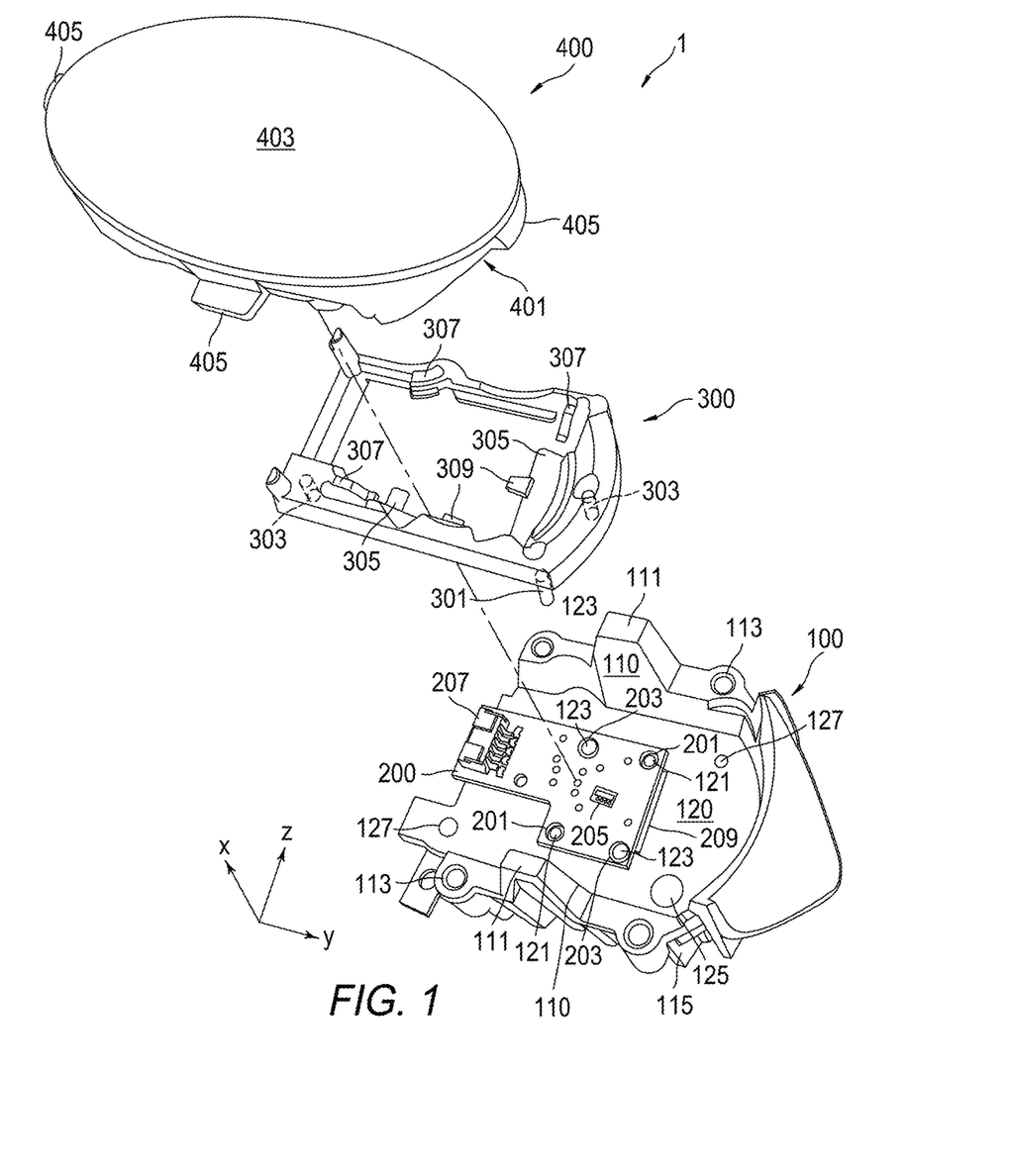
FIG. 1 is an exploded view of a lighting device according to an embodiment of the invention.

FIG. 1 is an exploded view of a lighting device according to an embodiment of the present application. As seen in FIG. 1, the lighting device 1 includes a light source support 100, light source 200, alignment frame 300, and an optical element 400. The alignment frame 300 is used to facilitate alignment of the light source 200 with the optical element. In the embodiment shown, the light source support is implemented as a heat sink 100, the light source is implemented as a printed circuit board (PCB) 200 having a light emitting element 205 thereon, and the optical element is implemented as a collimator lens 400. These exemplary implementations will be used throughout this disclosure.

Figure 2:
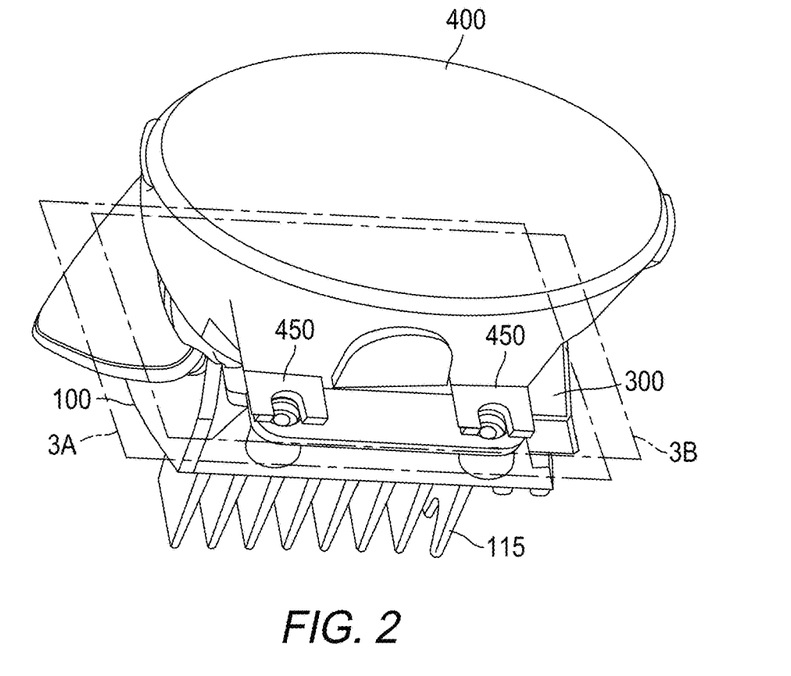
FIG. 2 is a perspective view of a lighting assembly in accordance with another embodiment of the invention.

In the embodiment of FIG. 1, heat sink 100 provides a body to which the PCB 200, alignment frame 300 and lens 400 are connected to form the assembled lighting device 1. Heat sink 100 includes a sidewall 110 generally protruding from a body of the heat sink 100 to form a recessed support surface 120 for supporting the PCB 200. Sidewall 110 includes lens contact surfaces 111 and blind holes 113. Lens contact surfaces 111 support a corresponding surface of the lens 400 when assembled, and blind holes 113 provide alignment and/or mounting holes for fixing the support 100 to a higher level assembly such as a light housing (not shown) or a lens bracket (not shown). In the embodiment of FIG. 1, cooling fins 115 may be provided on a back surface of the heat sink 100 as best seen in FIG. 2.

Heat sink 100 includes PCB alignment lugs 121 which protrude from the support surface 120 to align the PCB 200 into a predetermined position on the support surface 120. Further, PCB mounting holes 123 are provided in the support surface 120 for receiving mounting screws (not shown) which fix the PCB 200 to the support surface 120. An alignment frame adjustment recess 125 is provided for adjusting the alignment frame 300 relative to the heat sink 100, and alignment frame screw holes 127 enable the alignment frame 300 to be fixed to the heat sink 100, as further discussed below.

PBC 200 includes alignment holes 201 for mating with corresponding alignment lugs 121 or the heat sink to align the PCB on the support surface 120 of the heat sink. Screw openings 203 are provided to receive screws (not shown) for fixing the PCB 200 to the support surface 120 of the heat sink 100. PCB 200 further includes light emitting element 205, which may be a semiconductor light emitting element such as a laser or light emitting diode (LED). Electrical connector 207 is provided on the PCB 200 for connecting to peripheral components such as a power source. Thermally conductive material 209 (such as a paste or adhesive) may be used to provide improved heat transfer from the light source PCB 200 and light emitting element 205 to the heat sink 100.

Alignment frame 300 includes alignment and adjusting lug 301 for mating with the recess 125 to generally position the alignment frame 300 to the heat sink 100. In the embodiment shown, the alignment and adjusting lug 301 has a diameter smaller than a diameter of the alignment and adjusting recess 125 of the housing 100. This allows the alignment frame 300 to be moved in a Y-Z direction with respect to the heat sink 100 when the adjusting lug 301 is mated with the recess 125, as will be discussed below. Blind holes 303 receive screws to fix the heat sink 300 to the alignment frame after adjustment.

Alignment frame 300 includes reference surfaces 305 for receiving corresponding surfaces of a backside of the lens 400 such that the lens 400 is fixed in a predetermined positional relationship with the alignment frame 300 when assembled. Flexible members 307 of the alignment frame 300 contact corresponding surfaces of the lens 400 to spring bias the lens in a fixed Y-Z position relative to the alignment frame 300. Field of view alignment tabs 309 are used for camera positioning of the alignment frame on the heat sink 100 as will be discussed below.

Lens 400 includes a light input side 401 facing the light source 200, and a light output side 403 opposite the light input side. The light input side 401 includes surfaces for mating the lens 400 to the alignment frame as will be discussed below. Further, mating surfaces 405 of the lens 400 contact respective lens mating surfaces 111 of the heat sink 100 when the lighting device 1 is assembled.

Figure 3A:
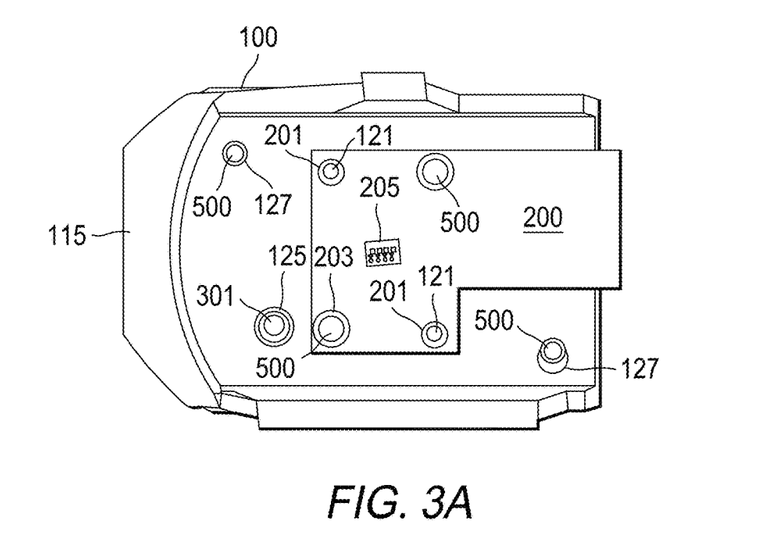
FIG. 3A is a planar view of plane 2A from a back side of the lighting device in FIG. 2.

FIG. 2 is a perspective view of a lighting assembly in accordance with another embodiment of the invention. The embodiment of FIG. 2 is similar to that of FIG. 1 except that lens 400 includes tabs 450 which are used to fasten the lens 400 to the heat sink 100. Planes 3A and 3B are used to describe assembly of the embodiment of FIG. 2. Specifically, FIG. 3A is a planar view of plane 3A from a back side of the lighting device in FIG. 2. As seen, the PCB 200 is aligned on the heat sink 100 such that the lugs 121 of the heat sink engage the holes 201 in the PCB 200. Screws 500 (shown in cross section) are provided from the front side of the PCB 200 through holes 203 to fasten the PCB 200 to the heat sink 100.

Figure 3B:
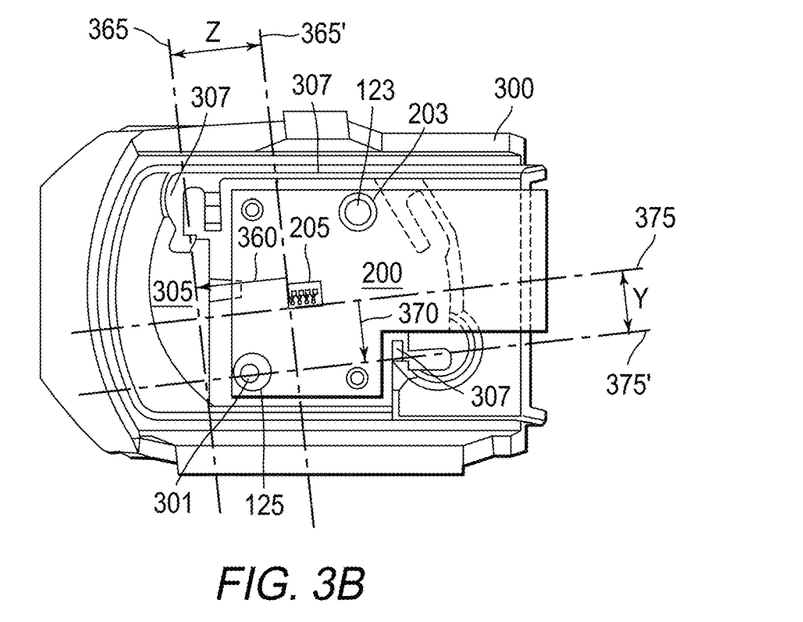
FIG. 3B is a planar view of plane 2B from a back side of the lighting device in FIG. 2.

FIG. 3B is a planar view of plane 3B from a back side of the lighting device in FIG. 2. As seen, alignment frame 300 is positioned within the recess formed by sidewalls 110 of the heat sink 100. In this position, the lug 301 of the alignment frame 300 is provided within the larger sized recess 125 in the housing 100. This allows the frame 300 to float in relation to the heat sink 100 to the extent of the size difference in the lug 301 within the recess 125. As shown by the arrows 360 and 370 in FIG. 3B, the frame 300 may be moved in the Y-Z plane with respect to the heat sink 100 and the light emitting element 205 on the PCB 200. The extent of movement along arrow 360 is shown by exemplary lines 365 and 365', and the extent of movement along arrow 370 is shown by exemplary lines 375 and 375'.

The extent of movement should allow for positioning the frame 300 such that the lens 400 is optimally aligned with the light emitting element 205 when fully assembled. Alignment frame 300 is positioned on the heatsink 100 and adjusted to the light source position with a camera. Specifically, measurements are taken between the edges of the alignment frame 300 and the light source 205, using a camera. The measurements Y and Z are compared to the nominal values Yn, Zn. The alignment frame 300 is then adjusted in the Y-Z plane in order to have Y=Yn and Z=Zn. The target position for the frame 300 is to reduce defocus. In addition, the frame 300 provides thermal and electrical insulation between the lens and the PCB/heatsink.

Figure 3C:
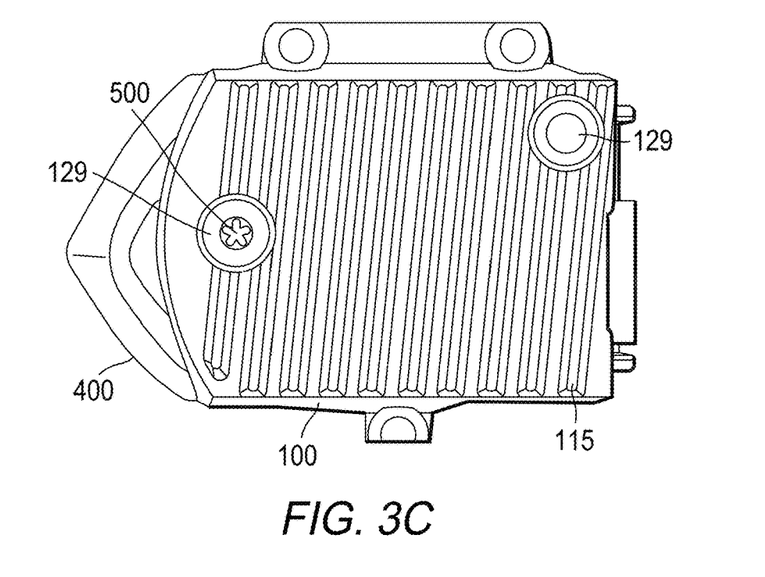
FIG. 3C is a planar view of a back side of the lighting device in FIG. 2.

FIG. 3C is a planar view of a back side of the lighting device in FIG. 2. As seen in FIG. 3C, after the frame 300 is adjusted to its target position, the frame is then fixed to the heatsink 100 by inserting two screws 500 from the back side of the heat sink 100 to engage the threaded blind holes 303 in the alignment frame 300. The lens 400 is then assembled to the heat sink to provide the lighting assembly shown in FIG. 2. In some embodiments, the alignment frame 300 is not fixed to the heat sink 100, but rather the lens 400 is fixed to the heatsink 100 with the frame locked there between.

Figure 4:
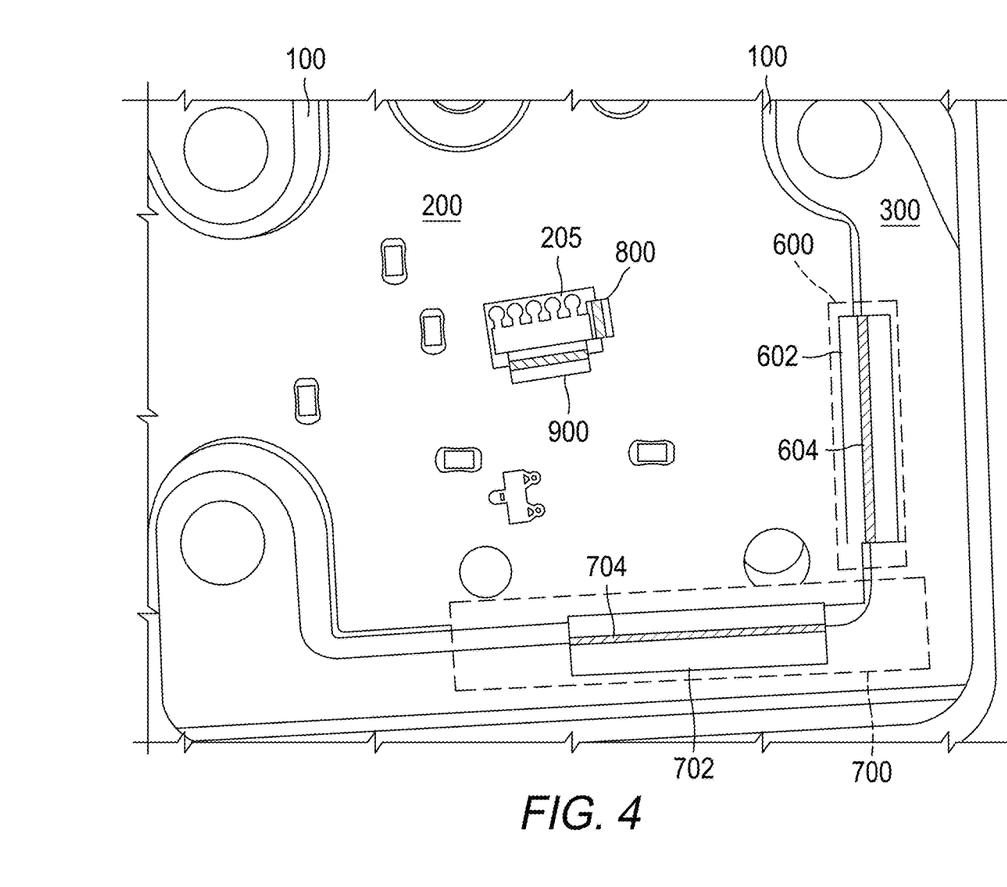
FIG. 4 shows a close up of the alignment process for the frame on the heatsink using a camera according to one embodiment.

FIG. 4 shows a close up of the alignment process for aligning the light emitting element 205 with the frame 300 on the heatsink 100 using a camera. For example, a high resolution camera having approximately 0.005 mm of resolution may be used. Area 600 illustrates x-direction or horizontal positioning of the frame 300 with respect to the light emitting element 205, while area 700 illustrates Z-direction or vertical positioning of the frame 300 with respect to the light emitting element 205. Field of view 602 indicates a portion where the camera is searching for vertical lines, and detected line region 604 indicates a line edge of the frame 300 detected by the camera. Similarly, field of view 702 indicates a portion where the camera is searching for horizontal lines, and detected line region 704 indicates a line edge of the frame 300 detected by the camera.

The accuracy of the camera alignment system is linked to the Field of View. Specifically, the accuracy is calculated based on the pixel density (number of pixels /mm) and size of the field of view. As the size of the field of view decreases, the accuracy of the camera alignment system increases. Thus, according to some embodiments, the alignment frame 300 includes field of view reference points 309 as shown in FIG. 1. The field of view reference points 309 protrudes inwardly from the frame 300 toward the light emitting element 205. Thus, these reference points permit a smaller field of view (i.e., 602, 702) of the camera to encompass a frame edge and the light element, which improves the accuracy of the system.

Figure 5:
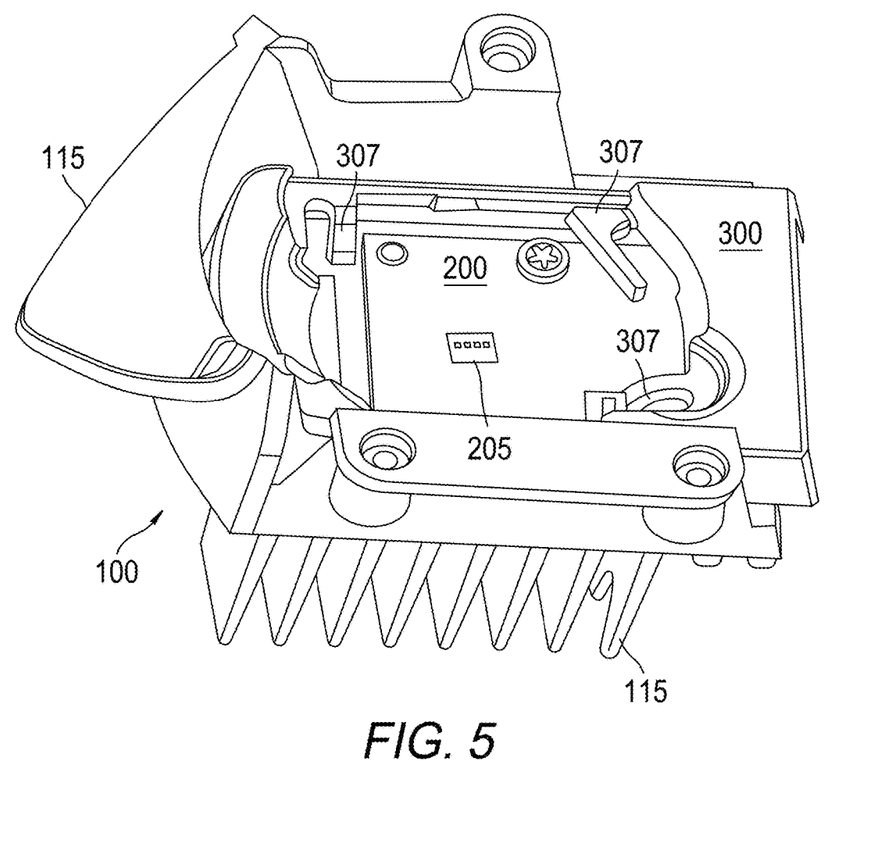
FIG. 5 shows a perspective view of another embodiment of the lighting device with the alignment frame fixed to the heat sink.

FIG. 5 shows a perspective view of another embodiment of the lighting device with the alignment frame 300 fixed to the heat sink 100. The embodiment of FIG. 4 is similar to that of FIGS. 1 and 2, except that the flexible members 307 are provided in different positions on the alignment frame 300. Flexible members 307 may be provided in any suitable position for spring biasing the lens 400 into a reference position on the frame 300.

Figure 6A:
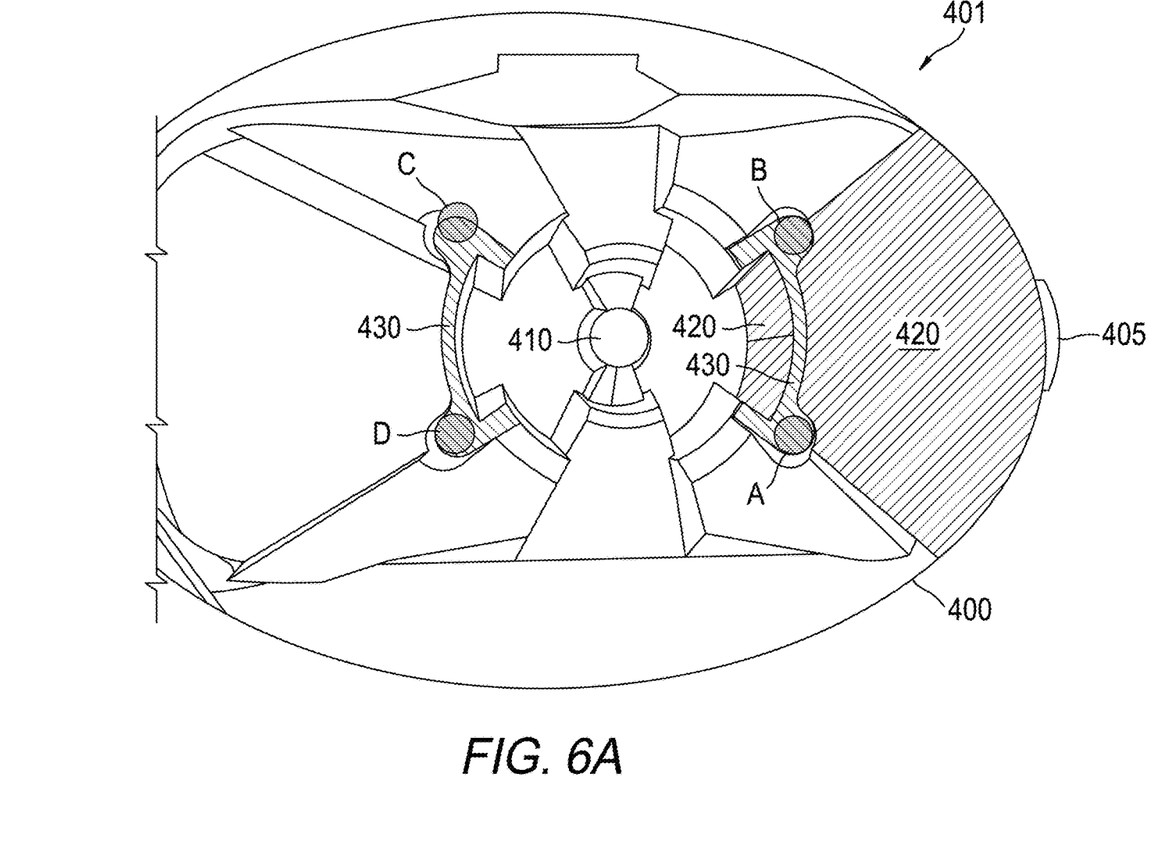
FIG. 6A is a plane view of a back side of the lens according to an exemplary embodiment of the invention.
Figure 6B:
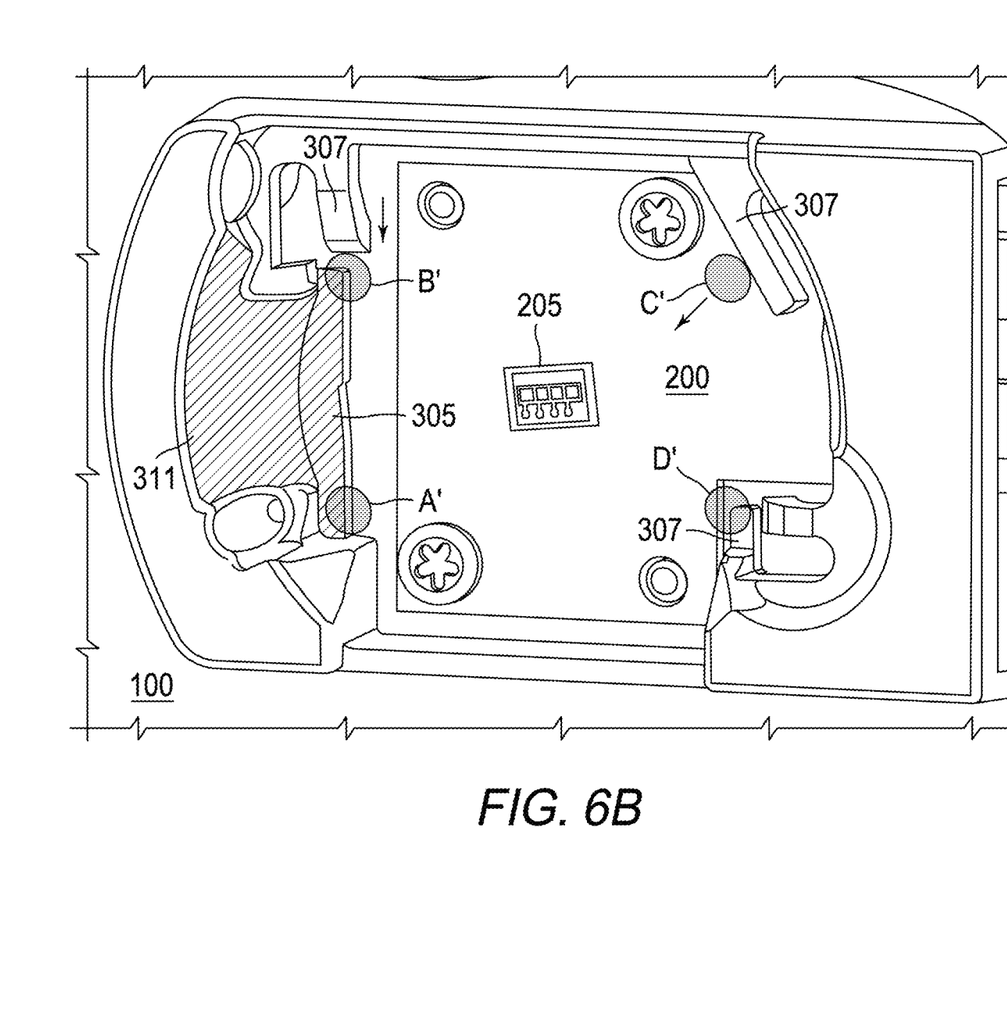
FIG. 6B is a plane view of a front side of the alignment frame assembled to the heat sink and in a condition to receive the lens according to an exemplary embodiment of the invention.

Assembly of the lens 400 to the alignment frame 300 after the frame is fixed to the heatsink 100 is illustrated in FIGS. 6A and 6B.

FIG. 6A is a plane view of a back side of the lens 400 according to an exemplary embodiment of the invention. As seen, the back side of the lens 400 includes a light entry surface 410, tapered surfaces 420 and contact surface 430. Contact points A, B, C and D illustrate reference positions for corresponding contact points on the alignment frame 300. FIG. 6B is a plane view of a front side of the alignment frame 300 assembled to the heat sink 100 and in a condition to receive the lens 400 according to an exemplary embodiment of the invention. Contact points A', B', C' and D' illustrate reference positions for corresponding contact points on the back side of the lens 400.

During assembly, the lens 400 is positioned into the alignment frame 300. Tapered surfaces 420 of the lens cooperate with tapered surfaces 311 of the alignment frame to guide the lens contact surfaces A, B, C and D into contact with corresponding surfaces A', B', C' and D' on the alignment frame 300. As seen in FIG. 6B, spring members 307 bias the lens 400 in the Y-Z plane into the reference surface 305 of the frame. Contact surface A on the lens 400 is to be fixed in the reference point A on the alignment frame 300. Contact surfaces B, C and D of the lens 400 are biased by spring members in the direction shown by the arrows in FIG. 6B. Thus, the spring members 307 bias the lens 400 toward the fixed reference point A.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A vehicle lighting device comprising:
a light source support;
a light source coupled to a planar support surface of said light source support;
an alignment frame coupled to the light source support in a predetermined positional relationship with respect to said light source; and
an optical element coupled to said light source support such that said alignment frame is interposed between the light source support and the optical element, wherein
said alignment frame comprises an alignment lug to engage an alignment recess in said light source support,
the alignment frame is adjustable in a plane parallel to the planar support surface when the alignment lug is engaged in the alignment recess, and
wherein said alignment lug is static relative to the alignment frame.

2. The vehicle lighting device of claim 1, wherein the light source support comprises a heat sink, the heat sink comprising:
said planar support surface to support said light source; and
cooling fins to dissipate heat from the light source supported on the support surface.

3. The vehicle lighting device of claim 2, further comprising a thermally conducting material provided between said light source and said light source support.

4. The vehicle lighting device of claim 2,
wherein the heat sink comprises contact surfaces to contact corresponding tabs on the optical element.

5. The vehicle lighting device of claim 1, wherein the light source comprises a semiconductor lighting element mounted on a printed circuit board.

6. The vehicle lighting device of claim 5, wherein the printed circuit board is fixed to a predetermined positon on the light source support.

7. The vehicle lighting device of claim 6, wherein the semiconductor lighting element comprises a light emitting diode (LED).

8. The vehicle lighting device of claim 1, wherein the alignment frame comprises at least one reference surface to contact a corresponding mating surface of the optical element.

9. The vehicle lighting device of claim 8, wherein the alignment frame further comprises at least one spring to bias said optical element into contact with said reference surface.

10. The vehicle lighting device of claim 8, wherein the alignment frame comprises at least one tapered surface to guide said optical element into position with respect to the alignment frame.

11. The vehicle lighting device of claim 1, wherein at least one spring biases said optical element in a plane parallel to said planar support surface toward a reference surface.

12. The vehicle lighting device of claim 1, wherein the alignment frame comprises at least one field of view reference to provide a reference for a camera alignment system.

13. The vehicle lighting device of claim 1, wherein the optical element comprises a light input side having contact surfaces to contact corresponding contact surfaces on the alignment frame.

14. The vehicle lighting device of claim 1, wherein the optical element comprises a collimator lens.

15. A vehicle lighting device comprising:
a light source support;
a light source coupled to said light source support;
an alignment frame coupled to the light source support in a predetermined positional relationship with respect to said light source; and
an optical element coupled to said light source support such that said alignment frame is interposed between the light source support and the optical element, wherein
the light source support comprises a heat sink, and the heat sink comprises:
a planar support surface to support said light source,
cooling fins to dissipate heat from the light source supported on the planar support surface, and
an alignment recess,
said alignment frame comprises an alignment lug to engage the alignment recess, and
the alignment recess has a diameter larger than the alignment lug such that the alignment frame is adjustable in a plane parallel to the planar surface support when the alignment lug is engaged in the alignment recess, and
wherein said alignment lug is static relative to the alignment frame.

16. A method for assembling a lighting device comprising:
providing a light source support having a light source fixed to a predetermined position on a planar supporting surface of the light source support;
placing an alignment frame on the planar supporting surface;
adjusting the alignment frame in a plane parallel to the planar supporting surface to an optical alignment position based on a nominal spacing from an edge of the alignment frame and the light source; and
placing an optical component in said alignment frame such that a light input side of the optical component is optically aligned with the light source;
wherein adjusting the alignment frame further includes engaging an alignment lug of the alignment frame with an alignment recess in said light source support and adjusting the alignment frame in the plane parallel to the planar support surface while the alignment lug is engaged in the alignment recess, and wherein said alignment lug is static relative to the alignment frame.

17. The method for assembling a lighting device of claim 16, further comprising a thermally conductive material provided between the planar supporting surface and the light source.

18. The method for assembling a lighting device of claim 16, wherein said adjusting the alignment frame comprises using a camera positioning system to move the alignment frame in a plane parallel to the planar supporting surface to an optical alignment position based on the nominal spacing from the edge of the alignment frame and the light source.

19. The method for assembling a lighting device of claim 16, wherein said placing the optical component in said alignment frame further comprises snapping the optical component into a spring biased reference position within the alignment frame.

20. The method for assembling a lighting device of claim 16, wherein said placing the optical component in said alignment frame comprises providing a biasing force to move the optical component along a plane parallel to the planar supporting surface into a spring biased reference position within the alignment frame.

* * * * *